United States Patent [19]
Ogasawara et al.

[11] Patent Number: 5,751,509
[45] Date of Patent: May 12, 1998

[54] DRUM SERVO SYSTEM USING A PLL WITH FREQUENCY DIVIDED REFERENCE CLOCK SIGNALS AS AN INPUT

[75] Inventors: Jin Ogasawara, Yokohama; Seiji Higurashi, Tokyo; Tomoyuki Shindo; Tetsuya Suwa, both of Yokohama, all of Japan

[73] Assignee: Victor Company of Japan, Ltd., Yokohama, Japan

[21] Appl. No.: 470,727

[22] Filed: Jun. 6, 1995

Related U.S. Application Data

[63] Continuation of Ser. No. 189,277, Jan. 31, 1994, abandoned, which is a continuation of Ser. No. 799,789, Nov. 29, 1991, abandoned.

[30] Foreign Application Priority Data

Nov. 30, 1990 [JP] Japan ................. 2-336126
Mar. 29, 1991 [JP] Japan ................. 3-121966

[51] Int. Cl.⁶ .................................. G11B 5/588
[52] U.S. Cl. ................................. 360/70; 360/75
[58] Field of Search ......................... 360/70, 73.11, 360/73.13, 73.06, 73.05, 73.07, 19.1, 75; 386/86, 91

[56] References Cited

U.S. PATENT DOCUMENTS

| | | | |
|---|---|---|---|
| 4,296,446 | 10/1981 | Zorbalas | 360/73.05 X |
| 4,348,699 | 9/1982 | Tsuchiya et al. | 360/73.07 X |
| 4,498,034 | 2/1985 | Shirakawa | |
| 4,550,345 | 10/1985 | Terada et al. | 360/73.05 X |
| 4,617,599 | 10/1986 | Noguchi et al. | 360/32 |
| 4,872,073 | 10/1989 | Fincher et al. | 360/51 |
| 4,907,102 | 3/1990 | Tsunoda et al. | 360/48 X |
| 5,012,352 | 4/1991 | Yoshimura et al. | 360/19.1 X |

FOREIGN PATENT DOCUMENTS

| | | |
|---|---|---|
| 2512574 | 3/1983 | France. |
| 56-157291 | 12/1981 | Japan. |
| 58-186811 | 10/1983 | Japan. |
| 61-067114 | 4/1986 | Japan. |
| 63-113841 | 5/1988 | Japan. |
| 2276065 | 11/1990 | Japan. |

*Primary Examiner*—Aristotelis M. Psitos
*Assistant Examiner*—James L. Habernehl
*Attorney, Agent, or Firm*—Lowe, Price, LeBlanc & Becker

[57] ABSTRACT

A drum servo system is provided with a rotation control device for controlling the rotation of a drum on the basis of a phase comparison signal obtained as a result of comparing the phase of an angle-of-rotation information signal obtained according to an angle of rotation of the drum with the phase of a control signal. The system also includes a detection device for determining the existence of a large data block or a small path block and outputting the result to a reference signal generator. The frequency of the reference signal is higher than that of the control signal, and is altered based on the output of the detection device. Frequency division is performed on the reference signal after it has been acted on by a phase locked loop, and the result is compared to the phase of the angle-of-rotation information signal in the rotation control device. Thus, a radical change in the control signal which occurs when the phase or frequency of the control signal is changed due to an abrupt external disturbance can preferably be absorbed in the comparison control device. Thereby, the rotation control device can always stably follow an abrupt change occurring in the control signal.

10 Claims, 9 Drawing Sheets

DRUM SERVO SYSTEM USING A PLL WITH FREQUENCY DIVIDED REFERENCE CLOCK SIGNALS AS AN INPUT

This application is a continuation of application Ser. No. 08/189,277 filed Jan. 31, 1994 now abandoned, which is a continuation of application Ser. No. 07/799,789 filed Nov. 29, 1991 now abandoned.

BACKGROUND OF THE INVENTION

1. Field of the Invention

This invention generally relates to a video tape recorder (hereunder abbreviated as VTR) and more particularly to a drum servo system suitable for use in a VTR.

2. Description of The Related Art

FIGS. 1 and 2 are schematic block diagrams each for illustrating a conventional drum servo system 100.

As shown in FIG. 1, for example, a control signal whose frequency is an integral submultiple of a frequency of a vertical synchronization signal separated from a composite video signal in a synchronized manner is supplied to a noninverting input terminal of a phase comparator 1 which is an element of a drum servo circuit (to be described later), namely, a phase control device A. Further, an angle-of-rotation information signal to be described later, which has a shaped waveform, is fed to an inverting terminal of the phase comparator 1. The phase comparator 1 compares the phase of the angle-of-rotation signal with that of the control signal and then outputs a phase comparison signal representing the result of the comparison to a loop filter 2. Thereafter, the loop filter 2 outputs to an amplifier 3 an output signal obtained from the phase comparison signal supplied thereto by removing high-frequency components thereof. Subsequently, the signal amplified by the amplifier 3 is fed to a motor 4. Thereby, a rotary head drum 5 having a well-known structure rotates in response to the signal, having a predetermined frequency value and phase control. An angle-of-rotation detector 6 generates an angle-of-rotation information signal according to an angle of rotation of the drum 5 and then outputs the angle-of-rotation signal to a waveform shaping device 7. Subsequently, the device 7 shapes the waveform of the angle-of-rotation signal and outputs the angle-of-rotation signal, having a shaped waveform to the inverting input terminal of the phase comparator 1. The drum servo circuit is a portion composed of the phase comparator 1, the loop filter 2, the amplifier 3 and the waveform shaping device 7.

Thus the rotation of the drum 5 is always controlled by the phase control device A, to which the control signal is supplied.

Further, the configuration of FIG. 4 is obtained by connecting an output of a frequency divider 8 to the noninverting input terminal of the phase comparator 1. The same reference numerals designate the same parts of FIG. 1.

As shown in FIG. 4, a reference clock signal having a frequency higher than the frequency of the control signal is applied to the frequency divider 8. Thereafter, a frequency division signal having a frequency equal to the frequency of the control signal is outputted from the frequency divider 8 to the noninverting input terminal of the phase comparator 1 of the drum servo circuit (namely, the phase control means) 9, the operation of which is described above. In the instant application, frequency division is defined as an operation of obtaining a signal whose frequency is an integral submultiple of a frequency of another signal.

Thus the rotation of the drum 5 is controlled by the phase control means 9, to which a frequency division signal having the frequency equal to that of the control signal is supplied.

Regarding the configuration of FIG. 2, one of a plurality of signals, each having different frequencies is selected. A speed control signal is supplied from a reference loop 14 to a motor control loop 10 employing a normal reproducing speed. In contrast, the speed control signal is fed from a speed synthesizer 16 to the motor control loop 10 when employing a reproducing speed other than the normal reproducing speed. This selection is performed by operating a switch 18.

The reference loop 14 is composed of a frequency comparator 36 to which a vertical synchronization signal 22 is supplied, a filter 38, a voltage-controlled oscillator (VCO) 40 and a frequency divider 42. The speed synthesizer 16 is comprised of a programmed frequency divider 43, a frequency comparator 44, a filter 46, a VCO 48 and another programmed frequency divider 50. The switch 18 is used to select one of an oscillation signal outputted from the VCO 40 of the reference loop 14 and another oscillation signal outputted from the VCO 48 of the speed synthesizer 16 as a speed control signal. The motor control loop 10 consists of a frequency comparator 24, a loop compensating circuit 28, a polarity inverting circuit 30, a switch 32, a motor driving amplifier (MDA) 34, a motor 12 and a tachometer 26.

The above described conventional drum servo systems, however, have the following drawbacks. First, when changing the control signal supplied to the drum servo circuit (namely, the phase control device) A or 9, the drum servo circuit of each of the conventional drum servo systems responds to the change as if it received an abrupt disturbance from the outside. The drum servo circuit of each of the conventional servo systems gets into what is called "a floating state". This is especially true when the control signal is generated by changing the frequency division rate used to perform frequency division of a reference clock having a frequency larger than the frequency of the control signal in order to change the frequency of the control signal, and is fed to the drum servo circuit of each of the conventional drum servo systems. A phase error occurring in the drum servo circuit of each of the conventional drum servo systems immediately reflects this. Consequently, the drum servo circuit of each of the conventional drum servo systems responds to the change in frequency division ratio in a manner similar to that occuring when an abrupt disturbance originated from the outside occurs. Moreover, in case where a low-frequency (e.g., 30 hertz (Hz) or 25 Hz) employed in a VTR is used as the frequency of the control signal, a phase error occurring in the drum servo circuit of each conventional drum servo system as the result of the change in reference phase of the reference clock signal becomes large and thus the stability of the drum servo circuit of each drum servo system is decreased.

Second, in regard to the conventional drum servo system of FIG. 2, when a speed control signal supplied from the speed synthesizer 16 is selected and normal reproduction is performed by releasing the switch 18 from the left position of FIG. 2 and placing the switch 18 in the right position of FIG. 2, a control signal fed to the motor control loop 10 is liable to include noises if the response characteristic of the control loop 10 is set such that the control loop 10 makes a quick response. As a consequence, the precision of frequency control becomes low. Conversely, if the precision of the frequency control is set to be high, the response of the control loop 10 becomes slow.

Next, another drawback of the conventional drum servo system will be described hereinafter by referring to FIGS. 3 and 4. Reference numeral 100 denotes the conventional drum servo system; 200 a reference clock generator; 8 a frequency divider of which the division ratio is 1/M; 9 a drum servo circuit; 1 a phase comparator; 2 a loop filter; 3 an amplifier; 7 a waveform shaping device; 4 a motor; 5 a drum; and 6 an angle-of-rotation detector.

As shown in FIG. 3, the conventional drum servo system 100 for controlling the rotation speed and the rotation phase of a video head (not shown) generates a control signal having no frequency deviation on the basis of a reference clock signal sent from the reference clock generator 200. Thus drum servo operation is performed by this control signal.

More particularly, as shown in FIG. 4, a reference clock signal, which has a frequency higher than the frequency of the control signal and is outputted from the reference clock generator 200, is supplied to the frequency divider 8 which decreases the frequency of the reference clock signal to (1/M) times and then outputs to the noninverting input terminal of the phase comparator 1 of the drum servo circuit 9 a division signal having the same frequency as the control signal has. A drum rotation information signal, of which the waveform is shaped, is supplied to the inverting input terminal of the phase comparator 1 which compares the phase of the drum rotation information signal with that of the control signal and then outputs a phase comparison signal representing the result of the comparison to the loop filter 2. Thereafter, the loop filter 2 outputs a signal obtained by removing high-frequency components of the supplied phase comparison signal therefrom to the amplifier 3. Subsequently, the signal amplified by the amplifier 3 is fed to the motor 5. Thereby, the rotary head drum 5 having a well-known structure rotates being controlled by the control signal having a predetermined frequency. The angle-of-rotation detector 6 outputs a drum rotation information signal (hereunder sometimes referred to as an angle-of-rotation detection signal) to the waveform shaping device 7.

Thus the rotation of the drum 5 is controlled by the drum servo circuit 9 to which the frequency division signal having the same frequency as the control signal has is applied.

This conventional drum servo system has the following drawback. Where a video signal having a frequency deviation of, for instance, +0.1% and a sound signal having no frequency deviation are simultaneously recorded by means of a VTR having a well-known servo system, the drum servo system follows a reference signal separated from the video signal and thus the number of rotation of the drum is larger than a normal or regular number of rotation thereof by +0.1%. When reproducing a recording, the drum servo system follows a control signal, which has no frequency deviation and is generated from a reference clock signal, and thus the normal or regular number of rotation of the drum is maintained. Therefore, a number-of-rotations deviation of the drum is ±0%.

Hence, if a frequency deviation occurs in a video signal to be recorded, a lapse of time when magnetic tape touches and travels around the drum in case of reproducing the video signal (hereunder sometimes referred to simply as a reproducing time) is different from another lapse of time when the magnetic tape touches and runs around the drum in case of recording the video signal (hereunder sometimes referred to simply as a recording time) because of the fact that the number of rotations of the drum at the time of recording the video signal is different from that of rotations of the drum at the time of reproducing the recorded video signal. (In this case, the reproducing time is longer than the recording time by 0.1%.)

Thus, this conventional drum servo system has a drawback in that when a video signal having a frequency deviation and a sound signal having no frequency deviation are simultaneously recorded and thereafter the video and sound signals are simultaneously reproduced, a pitch of a sound indicated by the sound signal during reproduction differs from a pitch of the sound indicated by the sound signal at the time of the recording. (In this case, the former pitch becomes lower than the latter pitch.)

SUMMARY OF THE INVENTION

It is, therefore, an object of the present invention to provide a drum servo system having a rotation control device which can always and stably follow an abrupt change occurring in a control signal.

It is, accordingly, another object of the present invention to provide a drum servo system which can make a reproducing time substantially equal to a recording time.

To achieve the foregoing objects, the first embodiment of the present invention includes a drum servo circuit for reproducing a digital audio signal. This signal is produced by using sampling clocks asynchronous with a vertical synchronization signal of a video signal. The digital audio signal is recorded on slant tracks formed on a magnetic tape along with the video signal. The audio signal is reproduced by scanning the magnetic tape using a magnetic head provided on a rotating drum. Data represented by the digital audio signal is divided into a plurality of data blocks and recorded on the slant tracks. The data is divided into large data blocks and small data blocks, each having a predetermined number of data represented by the digital audio signal. The drum servo circuit includes a rotation control means for comparing the phase of an angle-of-rotation information signal obtained according to an angle of rotation of the drum with the phase of a control signal, for generating a phase comparison signal representing a result of comparing the phase of the angle-of-rotation information signal with the phase of the control signal and for controlling a rotation of the drum on the basis of the phase comparison signal. The drum servo circuit also includes detection means for reading data represented by an audio signal recorded on the slant tracks formed on the magnetic tape, for detecting which of a large data block and a small data block is the data block represented by the audio signal, and for outputting a signal representing a result of the detection. The drum servo circuit further includes reference signal generating means for generating a reference signal, the frequency of which is higher than that of the control signal, and receiving an output signal of the detection means and changing the frequency of the reference signal according to the output signal of the detection means. Also included is a phase locked loop means for receiving the reference signal and for generating and outputting a signal which is synchronized in phase with the reference signal. A frequency divider means for receiving an output signal of the phase locked loop means is also included. The frequency divider means also performs a frequency division on the received output signal of the phase locked loop means and outputs a signal obtained as a result of the frequency division. This output is received by the rotation control means as a control signal.

Thus a radical change in the control signal, which occurs when the phase or frequency of the control signal is changed similarly as an abrupt disturbance from the outside, can preferably be absorbed in the comparison control means. Thereby, the rotation control means can always and stably follow the abrupt change occurring in the control signal.

In a second embodiment of the present invention, a drum servo circuit is used to reproduce a digital audio signal by using sampling clocks asynchronous with a vertical synchronization signal of a video signal. The digital audio signal is recorded on slant tracks formed on a magnetic tape together with the video signal. The audio digital signal is reproduced by scanning the magnetic tape by using a magnetic head provided on a rotating drum. Data represented by the digital audio signal is divided into a plurality of data blocks and recorded on the slant tracks. Each of the data blocks is designated as being either a large data block or a small data block, each having a predetermined number of digital audio signals. The drum servo circuit includes a rotation control means for comparing the phase of an angle-of-rotation information signal obtained according to an angle-of-rotation of the drum with the phase of a control signal. The rotation control means is also used for generating a first phase comparison signal representing a result of comparing the phase of the angle-of-rotation information signal with the phase of the control signal and for controlling a rotation of the drum on the basis of the first phase comparison signal. A drum servo circuit also includes detection means for reading data represented by an audio signal recorded on the slant tracks formed on the magnetic tape and for detecting which of a large data block and a small data block composes the data block of the data represented by the audio signal, and for outputting a signal representing a result of the detection. The drum servo circuit further includes reference signal generating means for generating a reference signal, the frequency of which is higher than that of the control signal. Also included is phase locked loop means for receiving the reference signal and for generating and outputting a signal which is synchronized in phase with the reference signal. The phase locked loop means includes frequency divider means for generating and outputting a first frequency division signal, phase comparator means for receiving the first frequency division signal from the first frequency divider means and for comparing a phase of the reference signal with a phase of the received first frequency division signal and for generating a second phase comparison signal representing a result of the comparison between the phase of the reference signal and that of the first frequency division signal. The phase locked loop means further includes oscillator means for receiving the second phase comparison signal and for generating and outputting a signal, the frequency of which is controlled according to the second phase comparison signal. The first frequency divider means receives an output signal of the oscillator means and performs a frequency division on the output signal received from the oscillator means. The first frequency divider means also changes a frequency division ratio and generates, as well as outputs, a first frequency division signal representing a result of the frequency division performed on the output signal of the oscillator means. The drum servo circuit further includes second frequency divider means for receiving an output signal of the oscillator means of the phase locked loop means, for performing a frequency division on the received output signal of the oscillator means and for outputting a second frequency division signal obtained as a result of the frequency division of the output signal of the oscillator means to the rotation control means as a control signal.

Thus the reproducing time can be made to be equal to the recording time with high precision. Further, even if a video signal having a frequency deviation is recorded and reproduced together with a digital sound data signal having no frequency deviation, the rotation phase (namely, the angle of rotation) of the drum can be controlled on the basis of the digital sound data signal by applying the present invention to a well-known VTR. Thereby, a video signal can be reproduced completely in synchronization with a sound signal. Consequently, extremely high-quality reproduced image and sound can be obtained.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 8 is a schematic block diagram for illustrating a fourth embodiment of the present invention;

DETAILED DESCRIPTION OF THE PREFERRED EMBODIMENTS

Hereinafter, preferred embodiments of the present invention will be described in detail by referring to the accompanying drawings.

Figure 1:
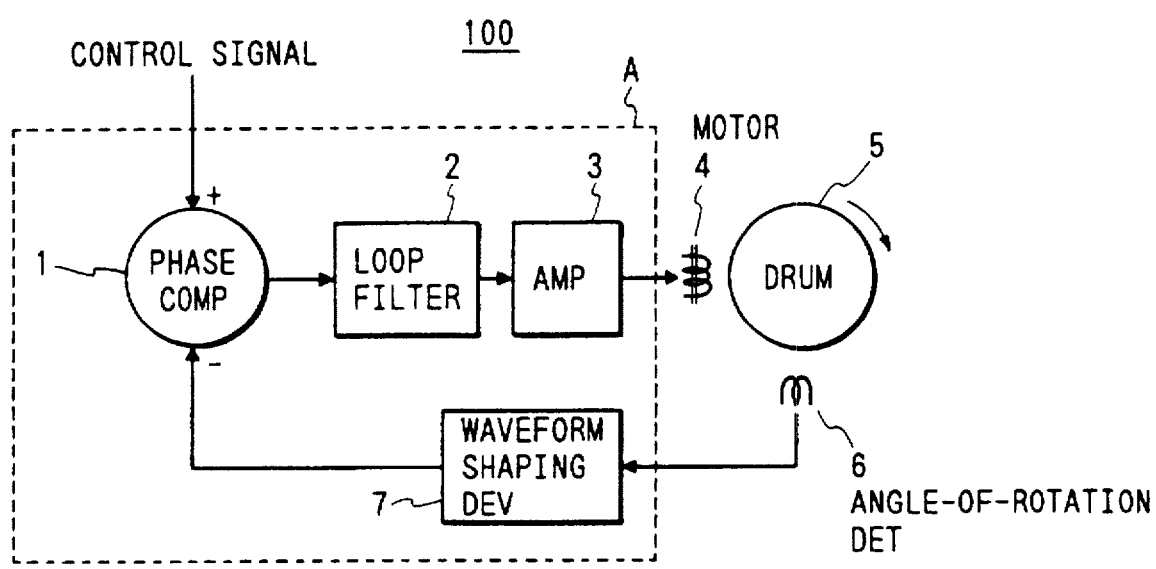
FIGS. 1 and 2 are schematic block diagrams for illustrating conventional drum servo systems.
Figure 2:
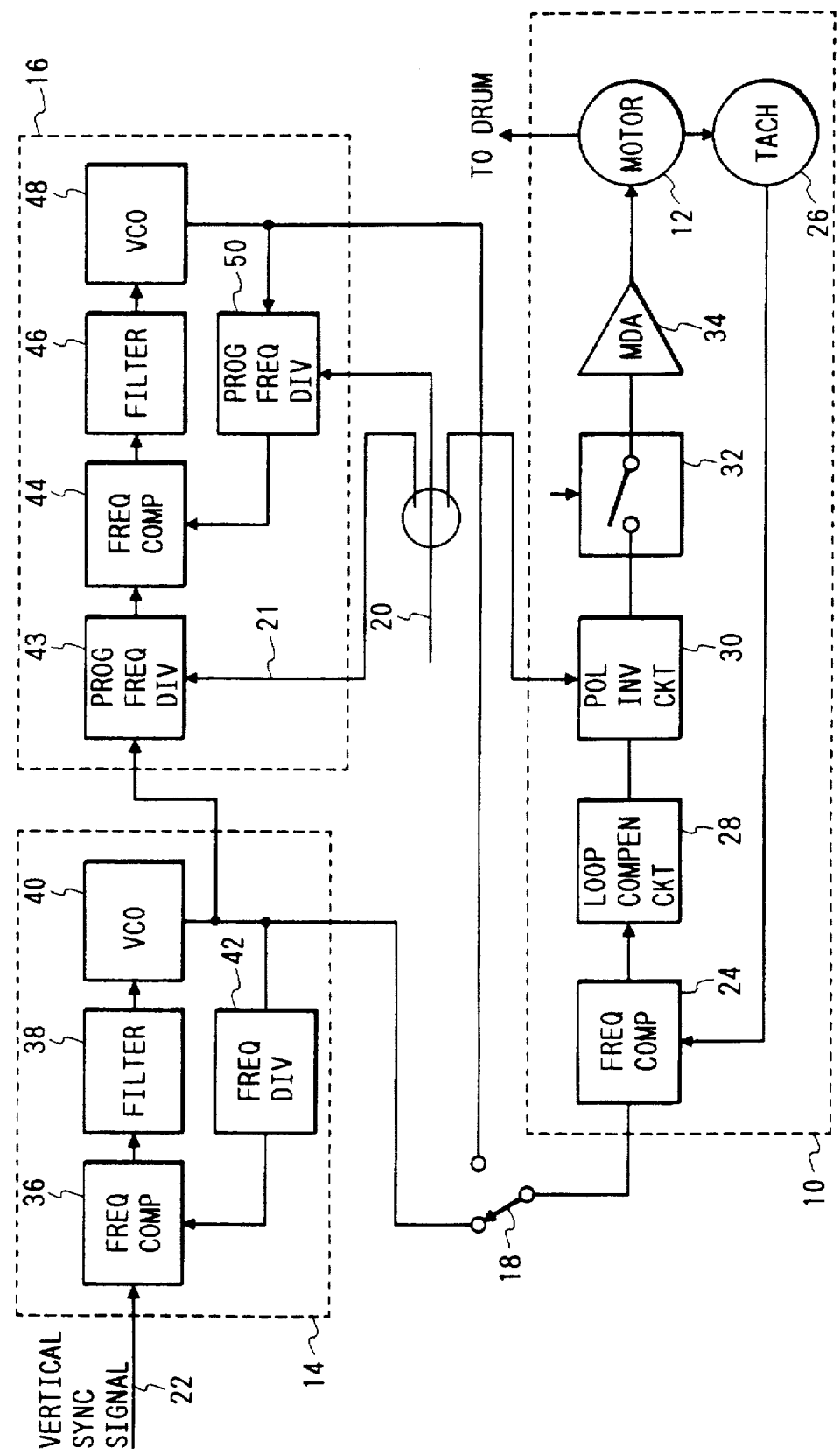
Figure 3:
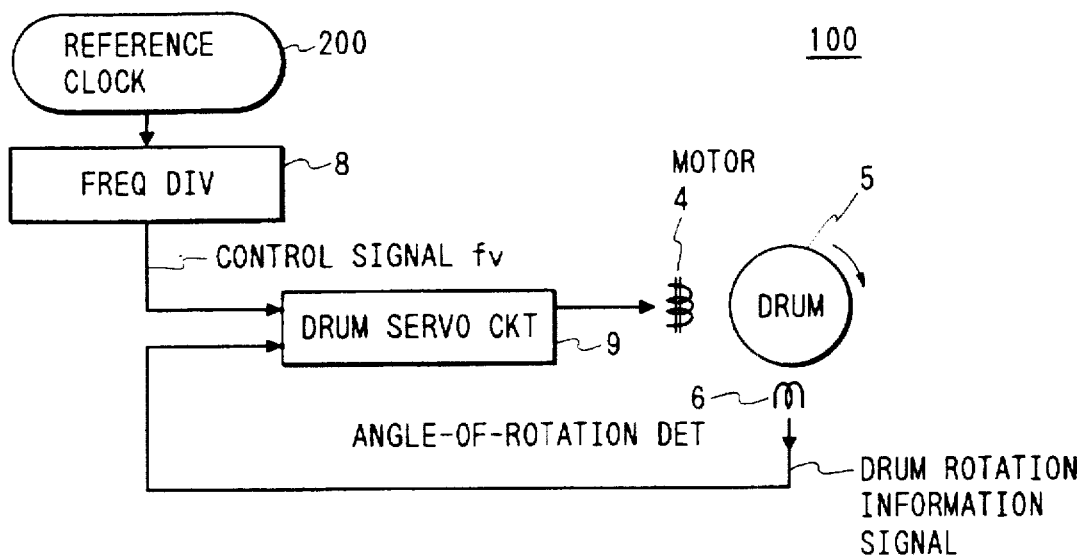
FIGS. 3 and 4 are schematic block diagrams for illustrating another conventional drum servo system.
Figure 4:
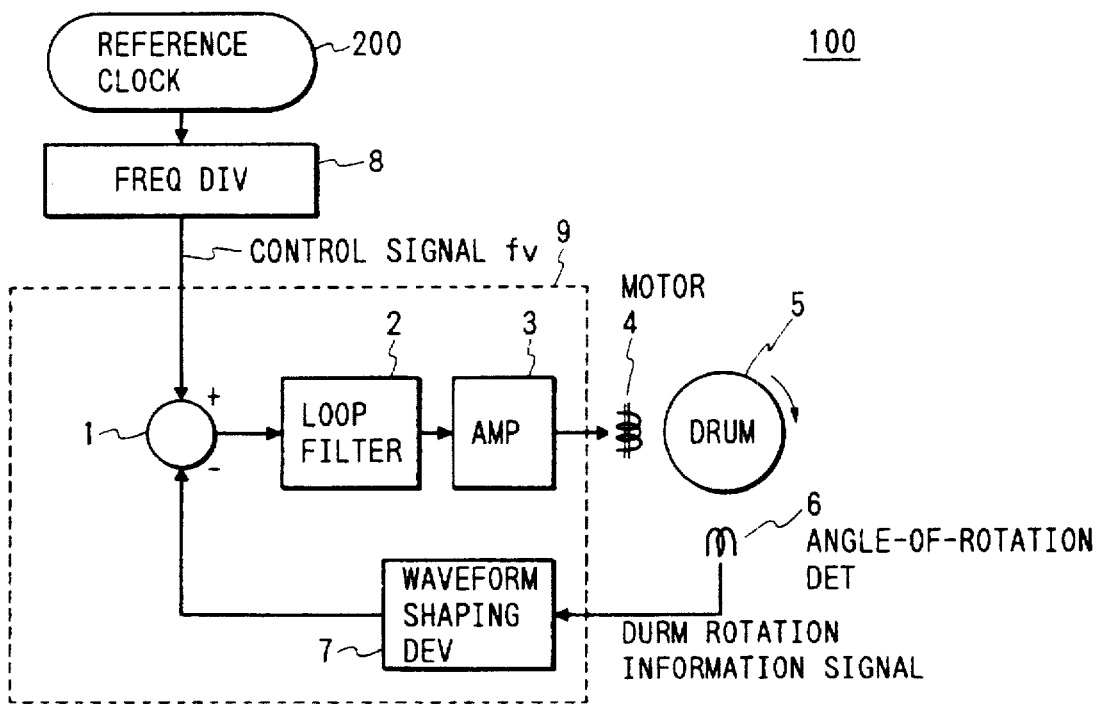
Figure 5:
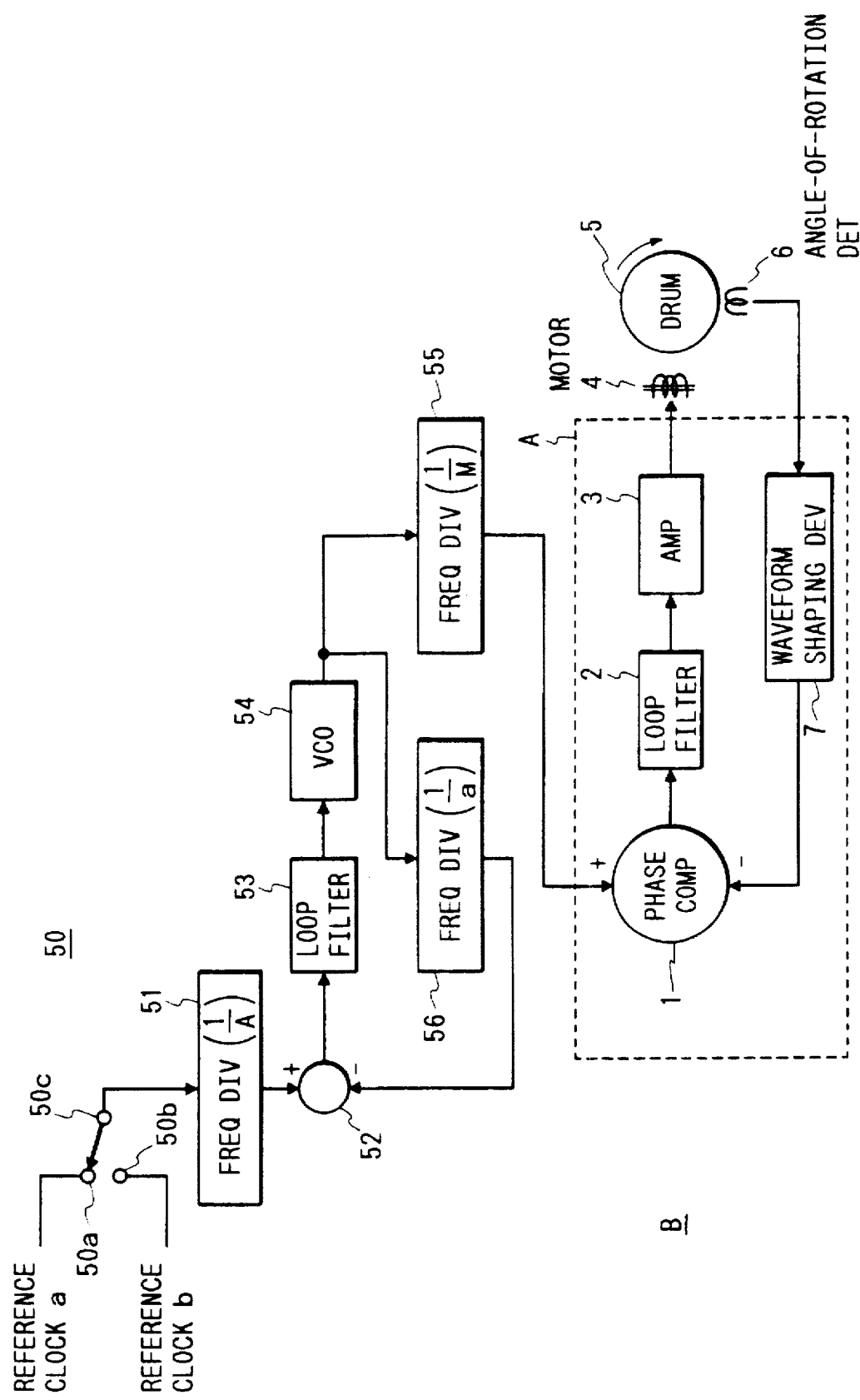
FIGS. 5 to 8 are schematic block diagrams respectively illustrating a first, second and third embodiments of the present invention.
Figure 6:
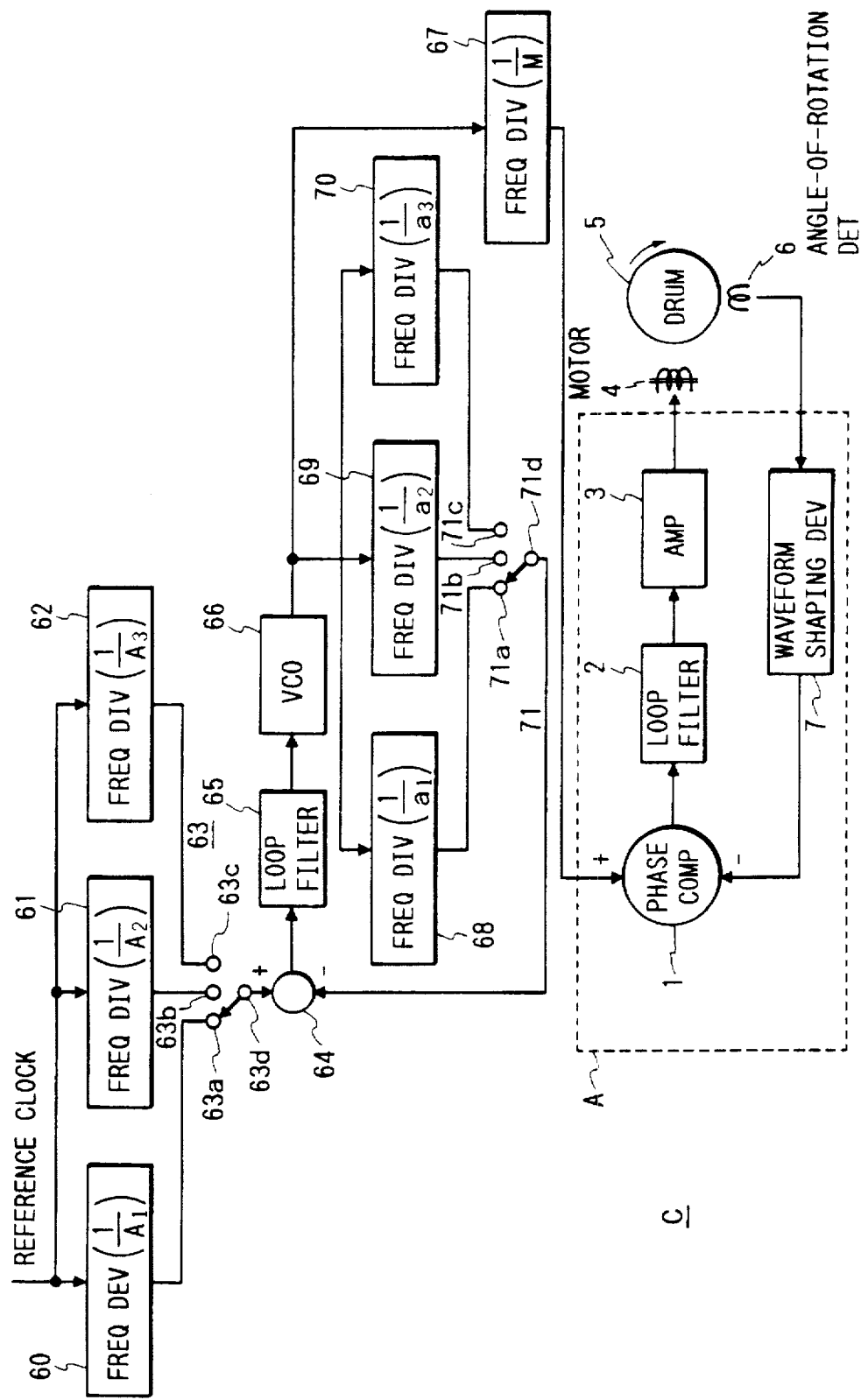
Figure 7:
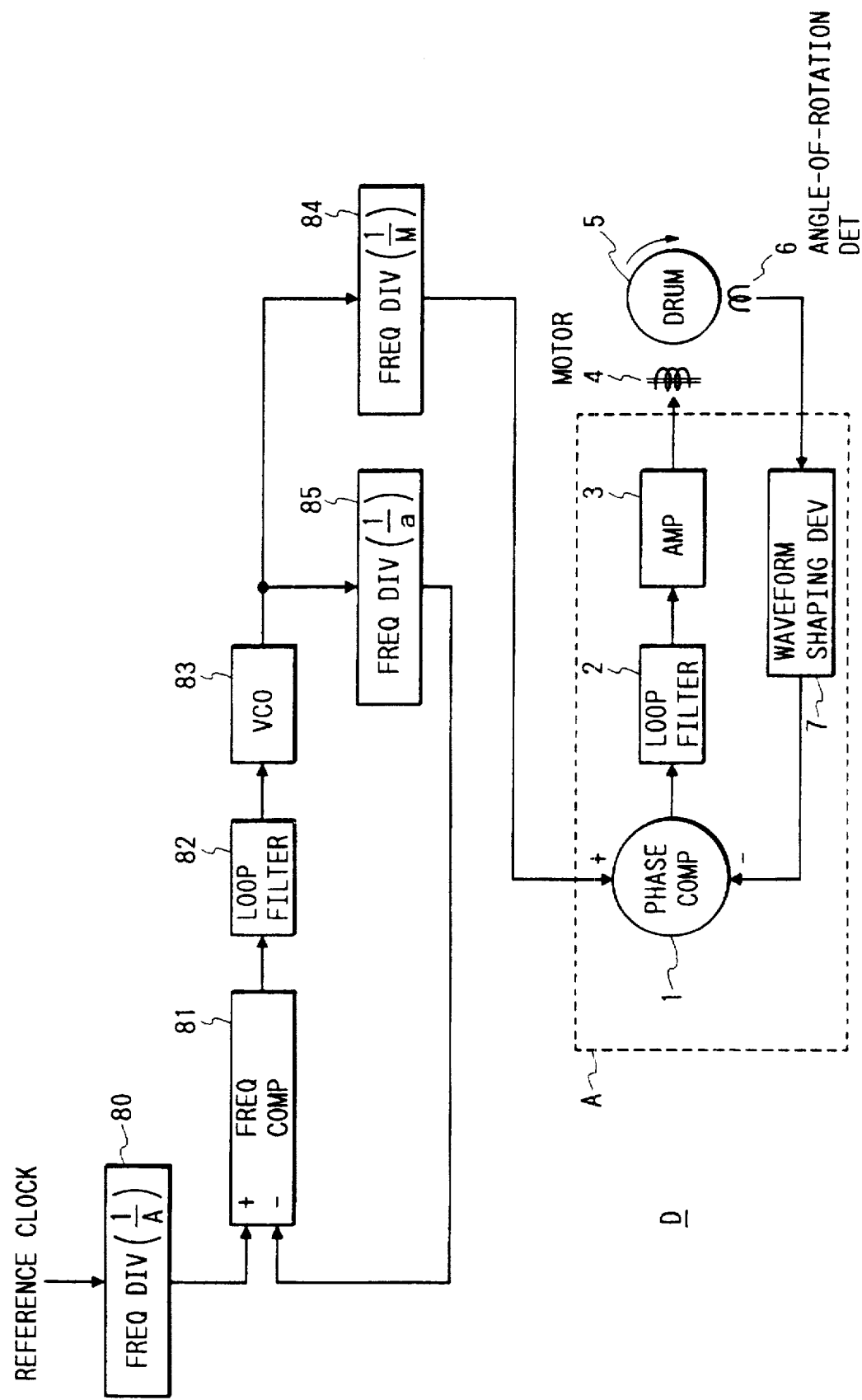

FIGS. 5 to 7 are schematic block diagrams respectively illustrating a first, second and third embodiments of the present invention. In these figures, like reference characters designate like or corresponding portions of the conventional drum servo systems of FIGS. 1 to 4.

The first embodiment (namely, a first drum servo system B of FIG. 5) is adapted to change one of reference clocks respectively having different frequencies to another thereof if necessary for controlling a rotating frequency of a drum. As shown in FIG. 5, this drum servo system B is comprised of a phase control device (namely, a rotation control device) A for controlling a rotating phase (thus controlling a rotation) of a drum 5 on the basis of a phase comparison signal obtained by comparing the phase of an angle-of-rotation information signal determined according to an angle of rotation of the drum 5 with the phase of a control signal and a phase locked loop (PLL). This constitutes a comparison control means for outputting the control signal to be supplied to the phase control means A by performing phase comparison control by use of a frequency division signal obtained by effecting a frequency division of any one of reference clocks (reference signals) a and b having frequencies higher than the frequency of the control signal. The PLL is composed of a phase comparator 52, a loop filter 53, a VCO 54 and a frequency divider 56. Reference numeral 55 also designates a frequency divider.

With drum servo system B, to change the frequency of the control signal for controlling the rotation of the drum 5, a stationary contact to be engaged with a movable contact 50c of a selection switch (hereunder referred to simply as a switch) 50 is changed between a stationary contact 50a to which a reference clock a is supplied and another stationary contact 50b to which another reference clock is supplied.

Where the switch 50 is in a switching state as shown in FIG. 5, a frequency division signal obtained by changing the frequency of the reference clock a into (1/A) thereof by the frequency divider 51 is fed to the noninverting input terminal of the phase comparator 52. Then the phase comparator 52 outputs to the loop filter 53 a phase comparison signal obtained by comparing the phase of this frequency division signal with that of another frequency division signal supplied to the inverting input terminal thereof from a frequency divider 56 which will be described later. Thereafter, the loop filter 53 outputs to the VCO 54 a signal obtained by removing a high-frequency component of the phase comparison signal supplied thereto.

An oscillation output signal outputted from the VCO 54 is bifurcated into the frequency dividers 55 and 56. The frequency of the oscillation output signal supplied to the frequency divider 55 is changed to (1/M) thereof. Subsequently, a signal obtained as the result of this frequency division is fed to the noninverting input terminal of the phase comparator 1 of the phase control means A. On the other hand, the frequency of the oscillation output signal applied to the frequency divider 56 of the PLL is changed to (1/a) thereof. Subsequently, a signal obtained as the result of this frequency division is supplied to the inverting input terminal of the phase comparator 52.

By setting the frequency division ratio (1/a) of the frequency divider 56 as larger than that (1/M) of the frequency divider 55, the frequency of the phase comparison signal outputted from the phase comparator 52 can be set higher than that of the phase comparison signal outputted from the phase comparator 1.

Thus, for drum servo system B, effects of an abrupt change of state of the drum servo circuit (In effect, a phase control device) A due to a change in the reference clock between the clock a and the clock b (which are equivalent to effects of a radical disturbance from the outside) can be absorbed in the PLL controlled by the VCO 54. When a change in reference clock directly causes a phase error of the drum servo circuit, the drum servo circuit can stably follow change in rotating phase of the drum 5 occurring due to change in reference clock.

In the second embodiment, a second drum servo system (C of FIG. 6) is adapted to change a frequency division signal obtained by performing a frequency division of a single clock if necessary for changing a rotating frequency of a drum. As illustrated in FIG. 6, the second drum servo system C is composed of a phase control device (a rotation control device) A for controlling a rotating phase (thus controlling rotation) of drum 5 on the basis of a phase comparison signal obtained by comparing a phase of an angle-of-rotation information signal determined according to an angle of rotation of the drum 5 with a phase of a control signal and a phase locked loop (PLL). This constitutes a comparison control means for outputting the control signal to be supplied to the phase control means A by performing phase comparison control by selecting and using one of three frequency division signals obtained by effecting frequency division of a reference clock (a reference signal) having a frequency higher than the frequency of the control signal. The PLL is composed of a phase comparator 64, a loop filter 65, a VCO 66, frequency dividers 68, 69 and 70 and a switch 71. The phase comparator 64, the loop filter 65, the VCO 66 and the frequency divider 67 are the same as the phase comparator 52, the loop filter 53, the VCO 54 and the frequency divider 55 of the first embodiment of FIG. 5.

In drum servo system C, to change the frequency of the control signal for controlling the rotation of the drum 5, a stationary contact to be engaged with a movable contact 63d of a selection switch (hereunder referred to simply as a switch) 63 is changed between a stationary contact 63a, to which a frequency division signal obtained by changing the frequency of a reference clock into (1/A$_1$) thereof in a frequency divider 60 is supplied, and another stationary contact 63b, to which a frequency division signal obtained by changing the frequency of the reference clock into (1/A$_2$) thereof in a frequency divider 61 is supplied, and further another stationary contact 63c, to which a frequency division signal obtained by changing the frequency of the reference clock into (1/A$_3$) thereof in a frequency divider 62 is supplied.

When the switch 63 is in a switching state as shown in FIG. 6, a frequency division signal obtained by changing the frequency of the reference clock into 91/A$_1$) thereof by the frequency divider 60 is fed to the noninverting input terminal of the phase comparator 64 of the PLL. The phase comparator 64 outputs to the loop filter 65 a phase comparison signal obtained by comparing the phase of this frequency division signal with that of another frequency division signal supplied to the inverting input terminal thereof and selected by a selection switch (hereunder referred to as a switch) 71. Thereafter, the loop filter 65 outputs to the VCO 66 a signal obtained by removing a high-frequency component of the phase comparison signal supplied thereto.

An oscillation output signal outputted from the VCO 66 is first bifurcated. The frequency of the oscillation output signal supplied to the frequency divider 67 is changed to (1/M) thereof. Subsequently, a signal obtained as the result of this frequency division is fed to the noninverting input terminal of the phase comparator 1 of the phase control means A. The other oscillation output signal is branched into three oscillation output signals (hereunder referred to as branch signals) respectively supplied to the frequency dividers 68, 69 and 70. The frequency of the oscillation output signal applied to the frequency divider 68 is changed by (1/a$_1$) thereof. Subsequently, a signal obtained as the result of this frequency division is supplied to the stationary terminal or contact 71a of the switch 71. Similarly, the frequency of the oscillation output signal applied to the frequency divider 69 is changed to (1/a$_2$) thereof. Subsequently, a signal obtained as the result of this frequency division is supplied to the stationary terminal or contact 71b of the switch 71. Further, the frequency of the oscillation output signal applied to the frequency divider 70 is changed into (1/a$_3$) thereof. Subsequently, a signal obtained as the result of this frequency division is supplied to the stationary terminal or contact 71c of the switch 71.

For the switching state of switch 71 of FIG. 6, the frequency of the oscillation output signal supplied to the frequency divider 68 is changed to (1/a$_1$) thereof. Subsequently, a signal obtained as the result of this frequency division is fed to the inverting input terminal of the phase comparator 64.

By setting each of the frequency division ratio (1/a$_1$) of the frequency divider 68, (1/a$_2$) of the frequency divider 69 and (1/a$_3$) of the frequency divider 70 larger than that (1/M) of the frequency divider 67, the frequency of the phase comparison signal outputted from the phase comparator 64 can be set as higher than that of the phase comparison signal outputted from the phase comparator 1.

Thus, for drum servo system C, effects of an abrupt change of a state of a drum servo circuit (the phase control device) A, which are equivalent to effects of a radical external disturbance, can be absorbed in the PLL controlled by the VCO 66 by changing the combination of switching states of the switches 63 and 71. The drum servo circuit can stably follow change in the rotating phase of the drum 5 occurring due to change in reference clock.

A third embodiment (illustrated as third drum servo system D of FIG. 7) is constructed by employing a frequency comparator 81 instead of the phase comparator 52 of the PLL of FIG. 5. As illustrated in FIG. 7, the third drum servo system D is composed of a phase control device (a rotation control device) A for controlling a rotating phase (thus controlling a rotation) of a drum 5 on the basis of a phase comparison signal obtained by comparing the phase of an angle-of-rotation information signal determined according to an angle of rotation of the drum 5 with the phase of a control signal and a PLL. This constitutes a comparison control device for outputting the control signal to be supplied to the phase control device A by performing phase comparison control by selecting and using a frequency division signal obtained by effecting frequency division of a reference clock (namely, a reference signal) having a frequency higher than the frequency of the control signal. The PLL is composed of a phase comparator 81, a loop filter 82, a VCO 83 and a frequency divider 85. The frequency divider 80 has the same structure as the frequency divider 51 does. Similarly, the loop filter 65 is the same as the loop filter 53 or 65. The VCO 83 is the same as the VCO 54 or 66. The frequency divider 84 is the same as the frequency divider 55 or 67. The frequency divider 85 is the same as the frequency divider 56.

For drum servo system D, to change the frequency of the control signal for controlling the rotation of the drum 5, the frequency of a frequency comparison signal outputted from the frequency comparator 81 is changed.

As shown in FIG. 7, a frequency division signal obtained by changing the frequency of the reference clock into (1/A) thereof by the frequency divider 60 is fed to the noninverting input terminal of the frequency comparator 81 of the PLL. Then the frequency comparator 81 outputs to the loop filter 82 a frequency comparison signal obtained by comparing the frequency of this frequency division signal with that of another frequency division signal supplied from the frequency divider 85 to the inverting input terminal thereof. Thereafter, the loop filter 82 outputs to VCO 83 a signal obtained by removing a high-frequency component of the frequency comparison signal supplied thereto. An oscillation output signal outputted from the VCO 83 is bifurcated. The frequency of the oscillation output signal supplied to the frequency divider 84 is changed to (1/M) thereof. Subsequently, a signal obtained as the result of this frequency division is fed to the noninverting input terminal of the phase comparator 1 of the phase control means A. The other oscillation output signal is supplied to the frequency divider 85. The frequency of the oscillation output signal applied to the frequency divider 85 is changed to (1/a) thereof.

By setting the frequency division ratio (1/a) of the frequency divider 85 larger than that (1/M) of the frequency divider 84, the frequency of the frequency comparison signal outputted from the frequency comparator 81 can be set higher than that of the phase comparison signal outputted from the phase comparator 1.

Thus, for drum servo system D, effects of an abrupt change of a state of a drum servo circuit (the phase control device) A, which are equivalent to effects of a radical external disturbance, can be absorbed in the PLL controlled by the VCO 83. This can prevent a phase error occurring in the drum servo circuit from immediately reflecting change in the frequency of a frequency comparison signal. Thus, the drum servo circuit can stably follow change in the rotating phase of the drum 5 occurring due to changes in the reference clock.

In FIGS. 5, 6 and 7, the switches 50, 63 and 71 are illustrated as mechanical switching devices. An electronic switching device, however, may be used as each of the switches 50, 63 and 71.

When employing the above described embodiments, the following effects can be obtained. First, when changing the control signal in a manner similar to a conventional system, the drum servo circuit (the phase control device) A can stably follow a change of a control signal because a transient phase error does not occur in the drum servo circuit by changing a reference clock. When changing the frequency of a control signal, effects of a step response at the time of changing the frequency of the control signal are absorbed in the PLL for generating a control signal. Thus, a radical change in input control signal does not occur. Consequently, the drum servo circuit A can stably follow a change in the frequency of a control signal. For the above described embodiments, a phase comparison between low-frequency signals used in a VTR is performed by using a frequency division signal obtained by effecting a frequency division of a reference clock signal which is produced as a result of a frequency division of a high-frequency signal. Thus even if the frequency or phase of the reference clock signal is changed, the drum servo circuit can stably follow the change in the frequency or phase of the reference clock signal. The PLL or comparison control device for generating a control signal performs a phase comparison between signals having a frequency higher than the frequency of the control signal. Thus, when changing the frequency of the control signal, the circuit of the comparison control device can quickly respond to the change of the control signal. Thereby, the drum servo circuit A, to which the control signal is supplied, can stably follow the change of the control signal.

Hereinafter, other preferred embodiments of the present invention are described by referring to FIGS. 8 and 9. Each of these drum servo systems is adapted to read time information relating to digital sound data represented by digital sound data signals, which are recorded onto, for example, video signal tracks on a magnetic tape in a superposing manner or on an independent signal track. The system also changes the frequency of the control signal for controlling the number of rotations of a drum according to time information by performing a phase comparison or a frequency comparison by using a reference signal having a frequency higher than the control signal frequency. Thus, in each of these embodiments, a clock oscillation frequency of the control signal can be changed differently from the conventional drum servo system of FIG. 3 employing the reference clock generator 200.

Figure 8:
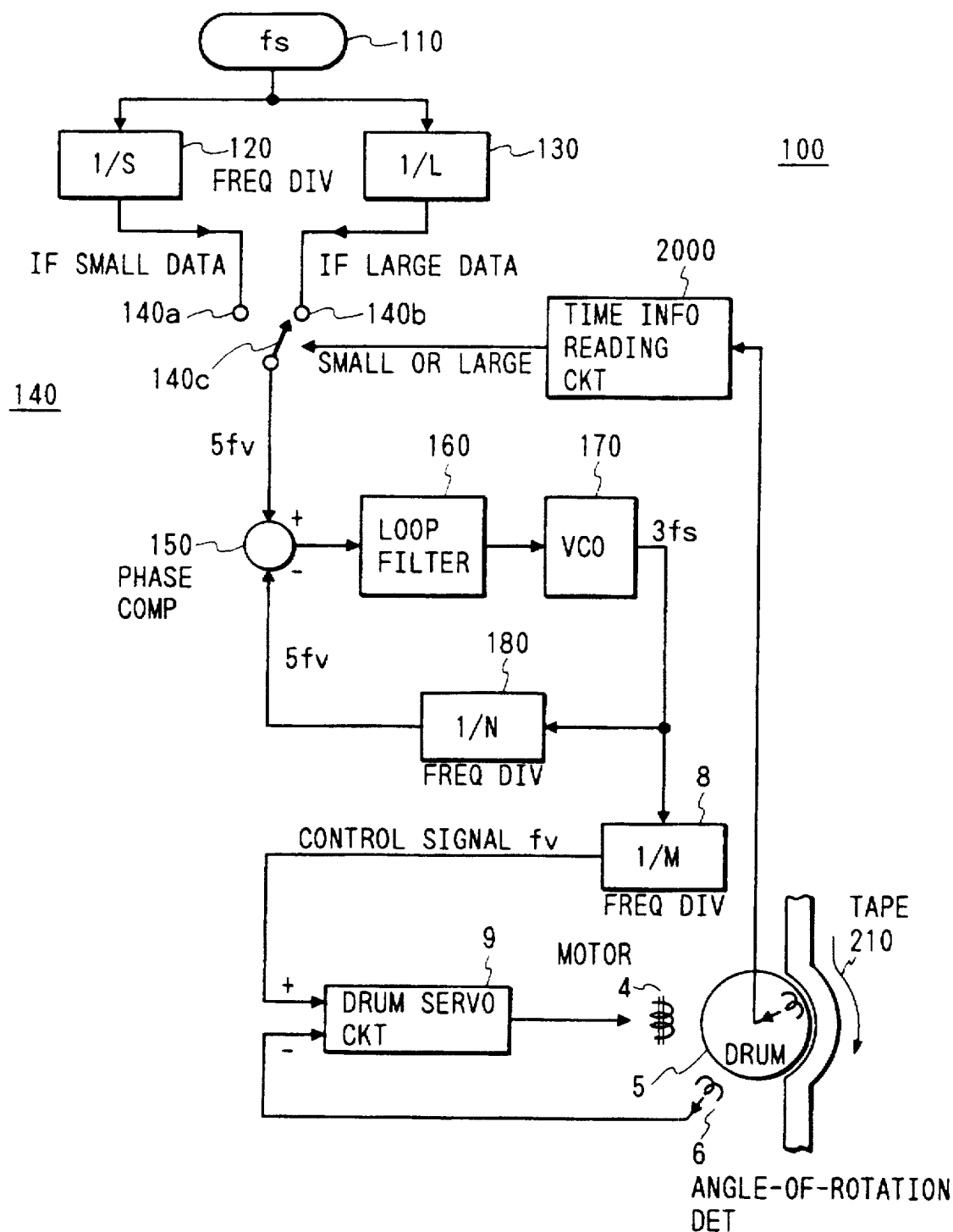
Figure 9:
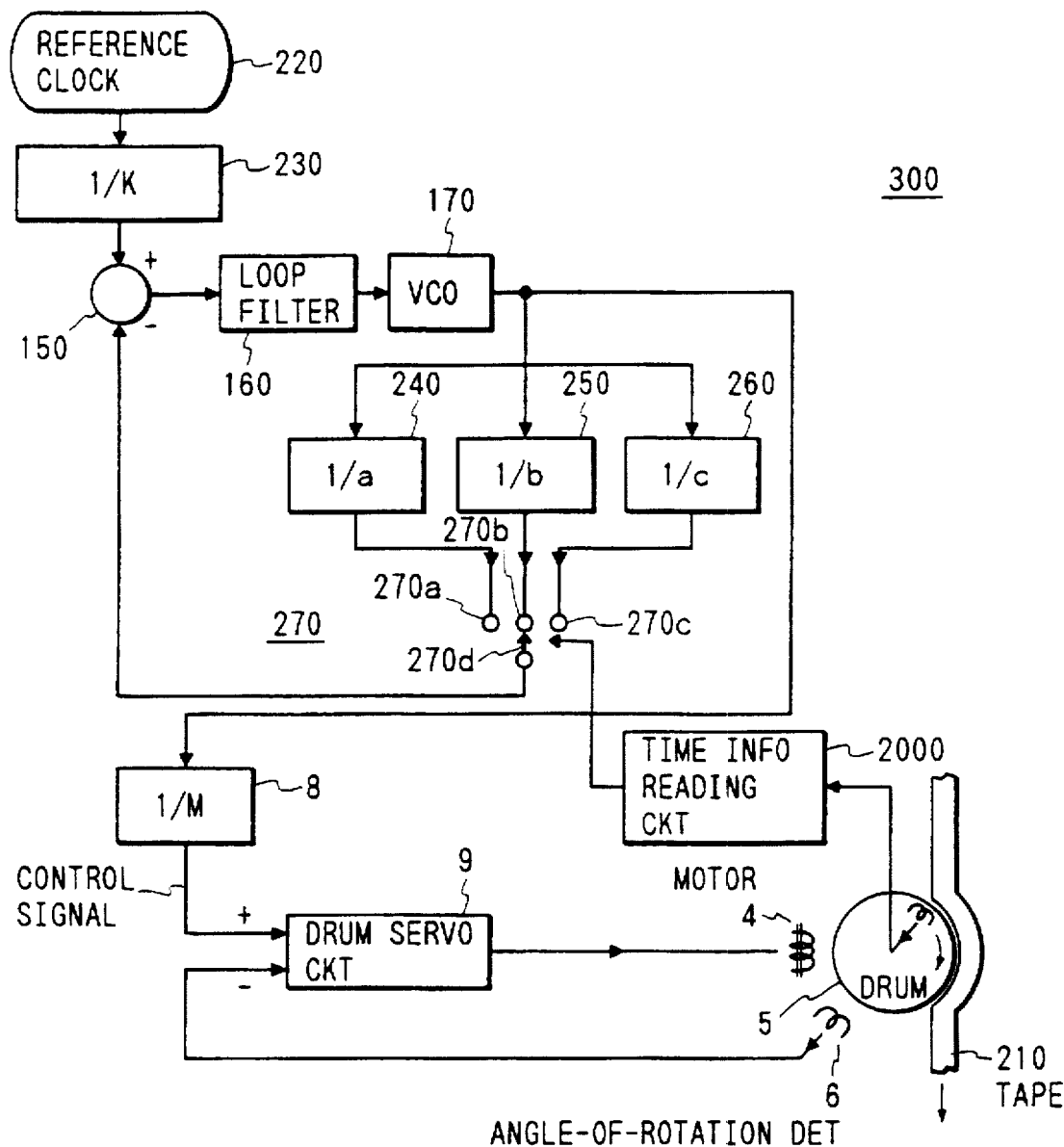
FIG. 9 is a schematic block diagram for illustrating a fifth embodiment of the present invention.
Figure 10:
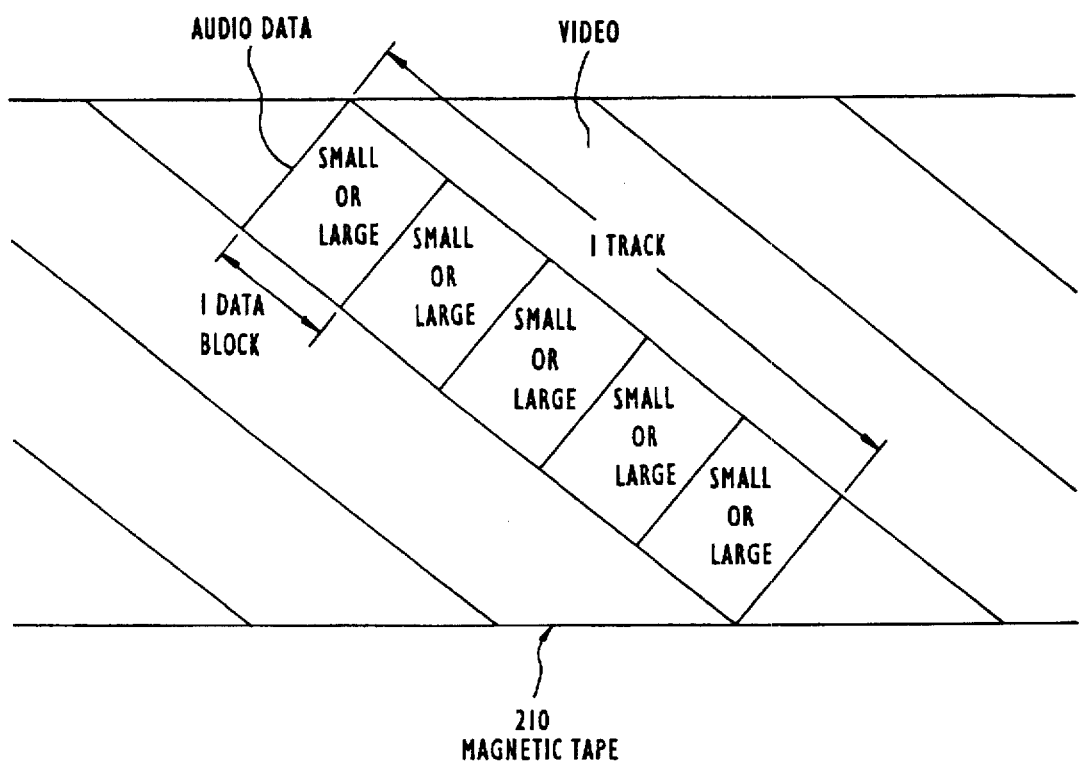
FIG. 10 is a diagram for illustrating time information recorded on a storage medium.

FIGS. 8 and 9 are schematic block diagrams respectively illustrating embodiments for simultaneously recording a video signal and a digital sound data signal (hereunder referred to as a fourth and fifth embodiments, respectively). Further, FIG. 10 is a diagram for illustrating the time information recorded on a recording medium.

In FIGS. 8 and 9, like reference characters designate like elements of the above described drum servo systems. Reference numerals 100 and 300 denote drum servo systems; 110 an audio-sampling-frequency generator; 120, 130, 180, 230, 240, 250 and 260 frequency dividers respectively having frequency division ratios (1/s), (1/L), (1/N), (1/K), (1/a), (1/b) and (1/c); 140 and 270 selection switches (hereunder referred to simply as switches); 140a, 140b, 270a, 270b and 270c stationary contacts; 140c and 270d movable contacts; 150 a phase comparator; 160 a loop filter; 170 a VCO; 2000 a time information reading circuit; 210 a magnetic tape; 220 a reference clock generator; fs an audio-sampling-frequency; and fv a video frequency.

Regarding time information, generally, there is no synchronous relation between the video frequency fv of a video signal and the audio-sampling-frequency of a sound data signal. Hence, it is usual that these signals are simultaneously recorded by employing the following method.

Each of the tracks are serially formed in an inclined position on the magnetic tape 210 for recording digital sound data signals. The tracks are divided or partitioned in the longitudinal direction thereof into five data blocks as illustrated in FIG. 10. These data blocks are classified into two groups as follows, according to the number of audio samples (or audio-sampling-data) to be packed and recorded in each of these data blocks. One group is a small-data block group of data blocks. Each data block of the small-data block group is composed of a predetermined small number S of audio-sampling-data. Hereunder, each block containing the predetermined small number S of audio-sampling-data will be referred to simply as a Small Data block. The other group is a large-data block group of data blocks. Each data block of the large-data block group is composed of a predetermined large number L of audio-sampling-data. Hereunder, each block containing the predetermined large number L of audio-sampling-data will be referred to simply as a Large Data block. The audio-sampling-data is digital data which is obtained by converting analog values sampled by using a sampling clock having a predetermined sampling frequency. Further, note that this sampling clock having the predetermined sampling frequency is asynchronous with a vertical synchronization signal of a video signal recorded simultaneously therewith. After the data blocks are preliminarily classified into Large Data and Small Data blocks, audio-sampling data represented by digital sound data signals are recorded in the data blocks.

X denotes the average number of audio-sampling-data per data block where the video frequency fv is equal to a rated frequency. The numbers S and L are predetermined in such a manner to meet the following condition:

S<X<L.

The numbers of audio samples of Small Data and Large Data blocks obtained by sampling at the audio-frequency sampling frequency with what is called a crystal precision, can be considered as precise information relating to time (time information). Thus, precise time information can be recorded by recording on the magnetic tape 210 information representing whether the blocks to be recorded are Small Data or Large Data blocks.

In the fourth embodiment, as illustrated in FIG. 8, the drum servo system 100 is composed of a drum servo circuit 9 for controlling a rotation of a drum 5 on the basis of a phase comparison signal obtained as a result of comparing the phase of an angle-of-rotation signal obtained according to an angle of rotation of the drum 5 with that of a control signal indicating a rotational frequency of the drum 5; and the time information reading circuit 2000 for outputting a time-information reading signal obtained by reading time information recorded on the magnetic tape 210 to be scanned by way of the drum 5 and the phase comparator 150 for selecting a plurality of frequency division signals obtained as a result of a frequency division of a reference signal having an audio-sampling frequency fs, which is effected by using different frequency division ratios (1/S) and (1/L), on the basis of at least the time information reading signal and for performing a control operation by effecting a phase comparison or a frequency comparison between signals having frequencies higher than the frequency of the control signal by use of the selected frequency division signals.

For the operation of drum servo system 100 where Large Data represent time information obtained from digital sound data signals recorded on the magnetic tape 210 by reproducing and scanning a track (or data blocks), on which the digital sound data signals are recorded, by means of the magnetic head loaded onto the drum 5, the time information reading circuit 2000 detects Large Data and outputs to the switch 140 a time information reading signal indicating that the switch 140 should be placed in the position corresponding to the frequency division 130 (the movable contact 140c should be connected to the stationary contact 140b). The switch 140 responds to the time information reading signal and is placed in the position corresponding to the frequency divider 130.

This results in a frequency division signal obtained by changing the frequency fs of an audio-sampling signal generated in the audio-sampling frequency generator 110 into (1/L) thereof by use of the frequency divider 130 being supplied to the noninverting input terminal of the phase comparator 150 of the PLL. The frequency of the frequency division signal from the frequency divider 130 is substantially equal to or slightly less than five times the frequency fv of a video signal. Further, the frequency division ratio (1/L) of the frequency divider 130 is less than that (1/S) of the frequency divider 120.

Then, the phase comparator 150 outputs to the loop filter 160 a phase comparison signal obtained by comparing the frequency of this frequency division signal with that of another frequency division signal supplied from the frequency divider 180 to the inverting input terminal thereof. Thereafter, the loop filter 160 outputs to the VCO 170 a signal obtained by removing a high-frequency component of the frequency comparison signal supplied thereto. The frequency (3 fs) of an oscillation output signal outputted from the VCO 170 is three times the audio-sampling frequency fs. The PLL is composed of this phase comparator 150, the loop filter 160, the VCO 170 and the frequency divider 180.

The oscillation output signal outputted from the VCO 170 is bifurcated. The frequency of the oscillation output signal supplied to the frequency divider 180 is changed to (1/N) thereof, where N is a predetermined positive integer. Subsequently, a signal obtained as the result of this frequency division is fed to the inverting input terminal of the phase comparator 150. The other oscillation output signal is supplied to the frequency divider 8. The frequency of the oscillation output signal applied to the frequency demultiplier 8 is changed to (1/M) thereof and as the consequence becomes equal to the video frequency fv. Thereafter, a signal obtained as the result of this frequency division is fed to the noninverting input terminal of the phase comparator (not shown) of the drum servo circuit 9 as a control signal for controlling the drum servo circuit 9.

By setting the frequency division ratio (1/N) of the frequency divider 180 larger than that (1/M) of the frequency divider 9, the frequency of the signal supplied from the phase comparator 150 can be set higher than that of the control signal supplied from the phase comparator of the drum servo circuit 9.

Where time information obtained by reproducing and scanning the track (or the data blocks) by means of the magnetic head loaded onto the drum 5 represents Small Data, the time information reading circuit 2000 outputs to the switch 140 a time information reading signal indicating that the switch 140 should be placed in the position corresponding to the frequency divider 120 (the movable contact 140c should be connected to the stationary contact 140a). The switch 140 responds to the time information reading signal and is placed in the position corresponding to the frequency divider 120.

This results in supplying a frequency division signal, obtained by changing the audio-sampling frequency fs of an audio-sampling signal generated in the audio-sampling frequency generator 110 into (1/S) thereof by use of the frequency divider 120, to the noninverting input terminal of the phase comparator 150. The frequency of the frequency division signal from the frequency divider 120 is substantially equal to or slightly larger than five times the frequency fv of a video signal. After this, the drum servo system operates similarly as in the case where Large Data represent time information. Thus, the drum servo system 100 of the fourth embodiment can change the frequency of the control signal for controlling the number of rotations of the drum by reading the time information recorded on the magnetic tape 210 and performing a phase comparison or a frequency comparison between signals having frequencies higher than the frequency of the control signal according to the time information.

As illustrated in FIG. 9, the drum servo system 300 of the fifth embodiment is adapted to perform a frequency division of a reference clock generated by the reference clock generator 220 by changing the frequency of the reference clock into (1/K) thereof and selecting one of frequency division signals, which are obtained by changing the frequency of an output signal of the VCO 170 into (1/a), (1/b) and (1/c) thereof, respectively, according to time information, for the purpose of changing the rotational frequency of the drum.

As shown in FIG. 9, the drum servo system 300 is composed of a drum servo circuit (namely, a rotation control means) 9 for controlling rotation of the drum 5 on the basis of a phase comparison signal obtained as a result of comparing the phase of an angle-of-rotation detecting signal obtained according to an angle of rotation of the drum 5 with the phase of a control signal prescribing a rotating frequency of the drum 5; the time information reading circuit 2000 for reading time information recorded on the magnetic tape to be scanned by way of the drum 5; and, the phase comparator 150 for selecting one of frequency division signals respectively obtained by performing frequency divisions of an output signal (a reference signal) of the VCO 170 by using different frequency division ratios (1/a), (1/b) and (1/c) according to at least the time information and effecting a phase comparison or a frequency comparison of a signal having a frequency higher than a frequency of the control signal by use of the selected frequency division signal. For the drum servo system 300, the frequency dividers 120 and 130 of the drum servo system 100 of FIG. 9 are replaced with the frequency divider 230 employing a frequency division ratio (1/K). A frequency division signal outputted from the frequency divider 230 is directly applied to the noninverting input terminal of the phase comparator 150. The frequency dividers 240, 250 and 260 which employ the frequency division ratios (1/a), (1/b) and (1/c), respectively, are used instead of the frequency divider 180. Each of frequency division signals outputted from the frequency dividers 240, 250 and 260 can be selected by using the switch 270 in response to the time information reading signal. In addition, the output signal selected by the switch 270 is directly supplied to the inverting input terminal of the phase comparator 150. In FIG. 9, like reference characters designate like composing elements of the drum servo system of FIG. 8.

To change the frequency of a control signal for controlling the drum 5 in the drum servo system 300, the movable contact 270d of the switch 270 is connected to one of the stationary contacts 270a, 270b and 270c, according to the time information signal outputted from the time information reading circuit 2000. The stationary contacts 270a, 270b and 270c are connected to which frequency division signals obtained by changing the frequency of the output signals (the reference signals) of the VCO 170 into (1/a), (1/b) and (1/c) thereof, respectively, on the basis of the frequency division signal obtained by changing the frequency of a reference clock into (1/K) thereof by the frequency divider 230.

In the state of the switch 270 as shown in FIG. 9, a frequency division signal outputted from the frequency divider 150 is fed to the inverting input terminal of the phase comparator 250. A frequency division signal obtained by changing the frequency of the reference clock into (1/K) thereof by the frequency divider 230 is fed to the noninverting input terminal of the phase comparator 150. Thus, the phase comparator 150 outputs to the loop filter 160 a phase comparison signal obtained by comparing the phase of this frequency division signal with that of another frequency division signal supplied to the inverting input terminal thereof and selected by the switch 270. Thereafter, the loop filter 160 outputs to the VCO 170 a signal obtained by removing a high-frequency component of the phase comparison signal supplied thereto.

The oscillation output signal from the VCO 170 is bifurcated. The frequency of a first portion of the oscillation output signal supplied to the frequency divider 8 is changed into by (1/M) thereof. Subsequently, a signal obtained as the result of this frequency division is fed to the noninverting input terminal of the phase comparator (not shown) of the drum servo circuit 9 as a control signal for controlling the drum servo circuit 9. The other portion of the oscillation output signal is further branched into three oscillation output signals (namely, branch signals) respectively supplied to the frequency dividers 240, 250 and 260. The frequency of the oscillation output signal applied to the frequency divider 240 is changed to (1/a) thereof. Subsequently, a signal obtained as the result of this frequency division is supplied to the stationary terminal or contact 270a of the switch 270. Similarly, the frequency of the oscillation output signal applied to the frequency divider 250 is changed to (1/b) thereof. Subsequently, a signal obtained as the result of this frequency division is supplied to the stationary terminal or contact 270b of the switch 270. Further, the frequency of the oscillation output signal applied to the frequency divider 260 is changed to (1/c) thereof. Subsequently, a signal obtained as the result of this frequency division is supplied to the stationary terminal or contact 270c of the switch 270.

By setting each of the frequency division ratios (1/a), (1/b) and (1/c) larger than (1/M), the frequency of the phase comparison signal outputted from the phase comparator 150 can be set higher than that of the phase comparison signal outputted from the phase comparator of the drum servo circuit 9.

Thus, for the drum servo systems 100 and 300, effects of an abrupt change of a state of a drum servo circuit of the phase control means A, which are equivalent to effects of a radical external disturbance, can be absorbed in the PLL by changing the combination of switching states of the switches 140 and 270. Thus, these drum servo circuits can stably follow change in the rotating phase of the drum 5 occurring due to change in reference clock.

When a phase comparison is performed in the phase comparator 150, a low-frequency signal obtained by effecting a frequency division of a signal having the audio-sampling frequency fs or of a reference clock is supplied to the noninverting input terminal of the phase comparator 150. Another low-frequency signal obtained by effecting a frequency division of an oscillation output signal of the VCO 170 having a frequency (3 fs), which is three times the audio-sampling frequency fs, is supplied to the inverting input terminal of the phase comparator 150. As a result, the phase comparison can be effected in a low-frequency region. Thus, even when the signal to be supplied to the noninverting input terminal of the phase comparator is selected from such low-frequency signals by the switches 140 and 270, the phase comparison can stably be performed without an abrupt phase variation or frequency variation.

The PLL for generating a control signal uses a frequency (the audio-sampling frequency fs) which is higher than the frequency of the control signal (namely, the video frequency fv). Therefore, when effecting a frequency control by changing the frequency of the control signal, the drum servo system can quickly respond to the change in the frequency of the control signal.

Furthermore, when recording and reproducing, a drum servo operation is effected on the basis of a reference clock or a signal having the audio-sampling frequency fs with oscillation precision of a quartz-crystal oscillator. Thus a reproducing time is substantially equal to a recording time. Additionally, a sound signal recorded simultaneously with a video signal can be reproduced substantially simultaneously with the video signal.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A control system for a rotatable drum with a reproducing head for scanning a recording medium, the recording medium storing a sequence of divided samples of a digital audio signal, the samples relating to a common fixed sampling frequency, the sequence of the samples being separated into blocks including at least first-type blocks and second-type blocks, the first-type blocks each having a first predetermined number of samples therein, the second-type blocks each having a second predetermined number of samples therein, the second predetermined number differing from he first predetermined number, the control system comprising:

first means for detecting whether a block currently scanned by the reproducing head is a first-type block or a second-type block, and generating a detection signal representative thereof;

second means for generating a control signal having a controllable frequency;

third means for controlling the frequency of the control signal in response to the detection signal; and fourth means for controlling rotation of the drum in response to the control signal.

2. A control system as recited in claim 1, wherein the fourth means comprises:

phase sensing means for sensing a phase of the rotation of the drum and generating a drum phase signal representative thereof;

comparing means for comparing a phase of the control signal and a phase of the drum phase signal to generate a drive signal in response to the control signal and the drum phase signal; and rotation control means for controlling the rotation of the drum in response to the drive signal.

3. A control system as recited in claim 2, wherein the recording medium also stores time information identifying a number of samples stored in the block currently scanned and indicative of whether the block currently scanned is said first-type block or said second-type block, and wherein said first means detects said time information and generates said detection signal in accordance therewith.

4. A control system as recited in claim 1, wherein the recording medium also stores a video signal asynchronous with the digital audio signal.

5. A control system as recited in claim 1, wherein the recording medium also stores time information identifying a number of samples stored in the block currently scanned and indicative of whether the block currently scanned is said first-type block or said second-type block, and wherein said first means detects said time information and generates said detection signal in accordance therewith.

6. An apparatus comprising:

a rotatable drum;

a reproducing head mounted on the rotatable drum;

a recording medium scanned by the reproducing head, the recording medium storing a sequence of divided samples of a digital audio signal, the samples relating to a common fixed sampling frequency, the sequence of the samples being separated into blocks including at least first-type blocks and second-type blocks, the first-type blocks each including a first predetermined number of samples, the second-type blocks each including a second predetermined number of samples, the second predetermined number differing from the first predetermined number;

first means for detecting whether a block currently scanned by the reproducing head is a first-type block or a second-type block, and generating a detection signal representative thereof;

second means for generating a control signal having a controllable frequency;

third means for controlling the frequency of the control signal in response to the detection signal; and fourth means for controlling rotation of the drum in response to the control signal.

7. An apparatus as recited in claim 6, wherein the fourth means comprises:

phase sensing means for sensing a phase of the rotation of the drum and generating a drum phase signal representative thereof;

comparing means for comparing a phase of the control signal and a phase of the drum phase signal to generate a drive signal in response to the control signal and the drum phase signal; and rotation control means for controlling the rotation of the drum in response to the drive signal.

8. An apparatus as recited in claim 7, wherein the recording medium further stores time information identifying a number of samples stored in the block currently scanned and indicative of whether the block currently scanned is said first-type block or said second-type block, and wherein said first means detects said time information and generates said detection signal in accordance therewith.

9. An apparatus as recited in claim 6, wherein the recording medium further stores a video signal asynchronous with the digital audio signal.

10. A control system as recited in claim 6, wherein the recording medium further stores time information identifying a number of samples stored in the block currently scanned and indicative of whether the block currently scanned is said first-type block or said second-type block, and wherein said first means detects said time information and generates said detection signal in accordance therewith.

* * * * *